US012605650B2

(12) United States Patent (10) Patent No.: US 12,605,650 B2
Sazawa et al. (45) Date of Patent: Apr. 21, 2026

(54) METHOD FOR REMOVING OIL IN CLEANING LIQUID

(71) Applicant: Shounan Engineering Inc., Kagoshima (JP)

(72) Inventors: Masaji Sazawa, Kagoshima (JP); Naosuke Sazawa, Kagoshima (JP)

(73) Assignee: Shounan Engineering Inc., Kagoshima (JP)

( * ) Notice: Subject to any disclaimer, the term of this patent is extended or adjusted under 35 U.S.C. 154(b) by 476 days.

(21) Appl. No.: 18/018,579

(22) PCT Filed: Feb. 24, 2022

(86) PCT No.: PCT/JP2022/007662
§ 371 (c)(1),
(2) Date: Jan. 30, 2023

(87) PCT Pub. No.: WO2022/181708
PCT Pub. Date: Sep. 1, 2022

(65) Prior Publication Data
US 2023/0294018 A1 Sep. 21, 2023

(30) Foreign Application Priority Data
Feb. 26, 2021 (JP) ................................. 2021-030714

(51) Int. Cl.
*B01D 17/02* (2006.01)
*B01D 39/16* (2006.01)
(52) U.S. Cl.
CPC ..... *B01D 17/0202* (2013.01); *B01D 39/1623* (2013.01); *B01D 2239/0618* (2013.01)
(58) Field of Classification Search
CPC ...... B01D 15/00; B01D 15/10; B01D 15/102; B01D 15/14; B01D 15/18; B01D 27/00;
(Continued)

(56) References Cited

U.S. PATENT DOCUMENTS 5,804,128 A * 9/1998 Ogata .................. B01D 29/216
264/516
2006/0096910 A1* 5/2006 Brownstein .......... B01D 39/163
210/508

FOREIGN PATENT DOCUMENTS

JP S3722688 8/1962
JP H08108004 4/1996
(Continued)

OTHER PUBLICATIONS

"International Search Report (Form PCT/ISA/210) of PCT/JP2022/ 007662," mailed on May 17, 2022, with English translation thereof, pp. 1-4.

*Primary Examiner* — Allison G Fitzsimmons
(74) *Attorney, Agent, or Firm* — JCIPRNET

(57) ABSTRACT

A method for removing oil in cleaning liquid, by which fine oil in cleaning liquid can be removed efficiently with a filter element for a general-purpose filter element for separating foreign substance. As a plurality of annular protrusions 22d are formed on an outer circumferential surface 22a of the filter element 22 along substantially whole length of the filter element 22 in axis line direction thereof, innumerable small eddies 40 are created in annular grooves 22e between the neighboring annular protrusions 22d. Such eddies 40 are created by Coanda effect in a situation where cleaning liquid having viscosity flows along the annular protrusions 22e. As such eddies 40 are of a negative pressure, fine oil 41 lighter than water is separated from water and captured by filament of the lipophilic filter element 22.

3 Claims, 7 Drawing Sheets

(58) Field of Classification Search
CPC ...... B01D 27/142; B01D 29/00; B01D 29/62;
B01D 29/88; B01D 29/885; B01D 35/00;
B01D 35/02; B01D 35/30; B01D 36/00;
B01D 36/02; B01D 36/04; B01D 39/00;
B01D 39/08; B01D 39/083; B01D
39/086; B01D 41/00; B01D 41/02; B01D
2201/30; B01D 2201/301; B01D 2201/32;
B01D 2201/325; B01D 24/00; D04H 3/00
See application file for complete search history.

(56) References Cited

FOREIGN PATENT DOCUMENTS

| JP | H1133315 | 2/1999 |
| JP | H11156104 | 6/1999 |
| JP | 2011104471 | 6/2011 |
| JP | 3182493 | 3/2013 |
| JP | 2014231055 | 12/2014 |
| JP | 2020138195 | 9/2020 |

\* cited by examiner

METHOD FOR REMOVING OIL IN CLEANING LIQUID

CROSS-REFERENCE TO RELATED APPLICATION

This application is a 371 application of the international PCT application serial no. PCT/JP2022/007662, filed on Feb. 24, 2022, which claims the priority benefit of Japan application serial no. 2021-030714, filed on Feb. 26, 2021. The entirety of the above-mentioned patent application is hereby incorporated by reference herein and made a part of this specification.

TECHNICAL FIELD

The present disclosure relates to a method for removing oil in cleaning liquid. More specifically, the present disclosure relates to a method for removing oil in cleaning liquid, by which it is possible to remove fine oil in cleaning liquid for cleaning machined parts, etc.

BACKGROUND ART

It is necessary to remove cutting chips, grinding chips, etc., created in process of working such as machining, etc., from mechanical parts. As cleaning liquid for this, oily one and water soluble one are known. Water soluble cleaning liquid is often used as it has no flammability, explosiveness, etc. Various methods and apparatus have been proposed for this, such as cleaning by immersing in a cleaning liquid, spray cleaning with cleaning liquid, cleaning by air jet, etc. It is preferable for water soluble cleaning liquid used for this not to contain oil as possible, because oil is attached to lipophilic material to be cleaned and cleaning effect becomes low as a result when the oil contains fine lipophilic foreign substance. For this, oil-water separating filters for removing oil in cleaning liquid have been proposed (for example, Patent Document 1, Patent Document 2). These oil-water separating filters have special laminated filter structures, in which inorganic powder, inorganic fiber, etc., are used for fragmentating oil to be fine.

On the other hand, a fuel filter has been proposed that has a filtering portion composed of sponge filtering annular plates with various diameters and widths laminated so as to enlarge filtering area, though it is not for removing oil in cleaning liquid (Patent Document 3). With such a cylindrical fuel filter, fuel is filtrated causing fuel to flow radially of the fuel filter. On the other hand, further, the present applicant has proposed a filtering apparatus in a liquid reservoir equipped with a cylindrical filter element (Patent Document 4). Non-woven fabric such as highly lipophilic polypropylene (PP), polyurethane (PU), etc. With this filtering apparatus in a liquid reservoir, oil in cleaning liquid is removed mainly by an oil skimmer.

PRIOR ART DOCUMENTS

Patent Documents

Patent Document 1: JP, Published Patent Application H11-156104

Patent Document 2: JP, Published Patent Application 2020-138195

Patent Document 3: JP, Examined Publication of Utility Model S37-22688

Patent Document 4: JP, Registered Utility Model 3182493

SUMMARY OF THE INVENTION

Problems to be Solved by the Invention

While it is known that non-woven fabric made of polypropylene, etc., is lipophilic and has a high oil absorbability, it cannot exhibit performance of removing tiny amount of oil in a mixture in which fine oil (oil droplets) is sufficiently mixed with water. While it may be preferred to use a filter having a high removing ability of a tiny amount of oil such as one disclosed in Patent Documents 1 and 2 or the like for this, a filter having a special structure or constituent must be used for it. Further, safe disposal of such filter having a special structure or constituent without applying load on circumstances is not an easy matter but needs expense for it. While the fuel filter disclosed in Patent Document 3 is such one that filtrates fuel causing the fuel to flow radially of the fuel filter, it cannot remove fine oil in cleaning liquid. Further, the filtering apparatus disclosed in Patent Document 4 removes oil in cleaning liquid with an oil skimmer. With this filtering apparatus, foreign substance such as cutting chips is removed to prevent clogging by causing cleaning liquid to flow around outer periphery of a filter element in an axial direction thereof. That is, it is not intended here to remove oil with a filter element, but oil is removed with an oil skimmer disposed in another way. Although this oil skimmer can remove oil floating on a surface of cleaning liquid, it cannot remove fine oil within cleaning liquid. On the background of problems to be solved, the present disclosure solves the following problems.

The present disclosure provides a method for removing oil in cleaning liquid with which fine oil in cleaning liquid can be removed effectively using a general-purpose filter element for separating foreign substance.

The present disclosure also provides a method for removing fine oil in cleaning liquid with which fine oil in cleaning liquid can be removed effectively without using a special filter equipment exclusively for oil-water separation.

Means for Solving the Problems

The present disclosure employs the following means for solving the above problems.

That is, a method for removing oil in cleaning liquid of the present disclosure 1 is, in a cleaning liquid reservoir apparatus equipped with:

a cleaning liquid reservoir tank as a container for storing cleaning liquid to be fed to a cleaning portion for performing a definite cleaning operation, a feeding pump provided in the cleaning liquid reservoir tank for pumping up the cleaning liquid stored in the cleaning liquid reservoir tank and discharging it through a discharge port to feed it to the cleaning portion, a filter equipment provided neighboring to the cleaning liquid reservoir tank, and a filter element contained in the filter equipment for filtrating the cleaning liquid that has a cylindrical shape communicating with a cavity thereof;

the cleaning liquid fed from the feeding pump is caused to flow in a direction parallel to an axis line of the cylindrical filter element and only along the cylindrical outer circumferential surface thereof, thus causing the filter element to capture oil in the cleaning liquid.

The method for removing oil in cleaning liquid of the present disclosure 2 is such that, in the present disclosure 1, the filter element is made of non-woven fabric having an inclination of fiber density in which percentage voids becomes lower from an outer circumferential surface of the filter element towards an inner circumferential surface of the filter element.

The method for removing oil in cleaning liquid of the present disclosure 3 is such that, in the present disclosure 1 or 2, a plurality of annular protrusions are formed on a circumferential surface of the filter element.

The method for removing oil in cleaning liquid of the present disclosure 4 is such that, in any of the present disclosure 1 to 3, the cleaning liquid reservoir apparatus causes the cleaning liquid to flow only along the outer circumferential surface of the filter element only when the cleaning operation is suspended.

The method for removing oil in cleaning liquid of the present disclosure 5 is such that, in the present disclosure 4, the cleaning liquid reservoir apparatus comprises:

a first communicating flow path (24) for causing the discharge port of the feeding pump to communicate with an inlet port of the filter equipment (20), a second communicating flow path (25) for feeding cleaning liquid having been subjected to a secondary filtration from an outlet port of the filter equipment (20) to the cleaning portion, a first open/close valve (26) provided in the second communicating flow path (25) for opening-closing of the second communicating flow path (25), a drain port (21*d*) provided in the filter equipment (20) for discharging the cleaning liquid within the filter equipment (20) out of the filter equipment (20), a drain flow path (27) for causing the cleaning liquid to flow back from the drain port (21*d*) of the filter equipment (20) to the cleaning liquid reservoir tank, and a second open/close valve (28) provided in the drain flow path (27) for opening-closing of the drain flow path (27); and wherein the capturing of the oil with the filter element is performed with lipophilic fiber of the filter element in such a manner that, with the first open/close valve (26) being in a closed state and the second open/close valve in an open state, the cleaning liquid is caused to flow through a space between the inner circumferential portion of the filter equipment (20) and the outer circumferential surface of the filter element.

Advantageous Effect

With the method for removing oil in cleaning liquid, it is possible to remove effectively fine oil in cleaning liquid using a general-purpose filter element for separating foreign substance, so that expense for production and expense for operation can be decreased and disposal of filter elements thereof can be conducted in a safe manner without applying load on circumstances.

DETAILED EXPLANATION OF EMBODIMENTS (Cleaning Liquid Reservoir Apparatus Used in a First Embodiment)

Figure 1:
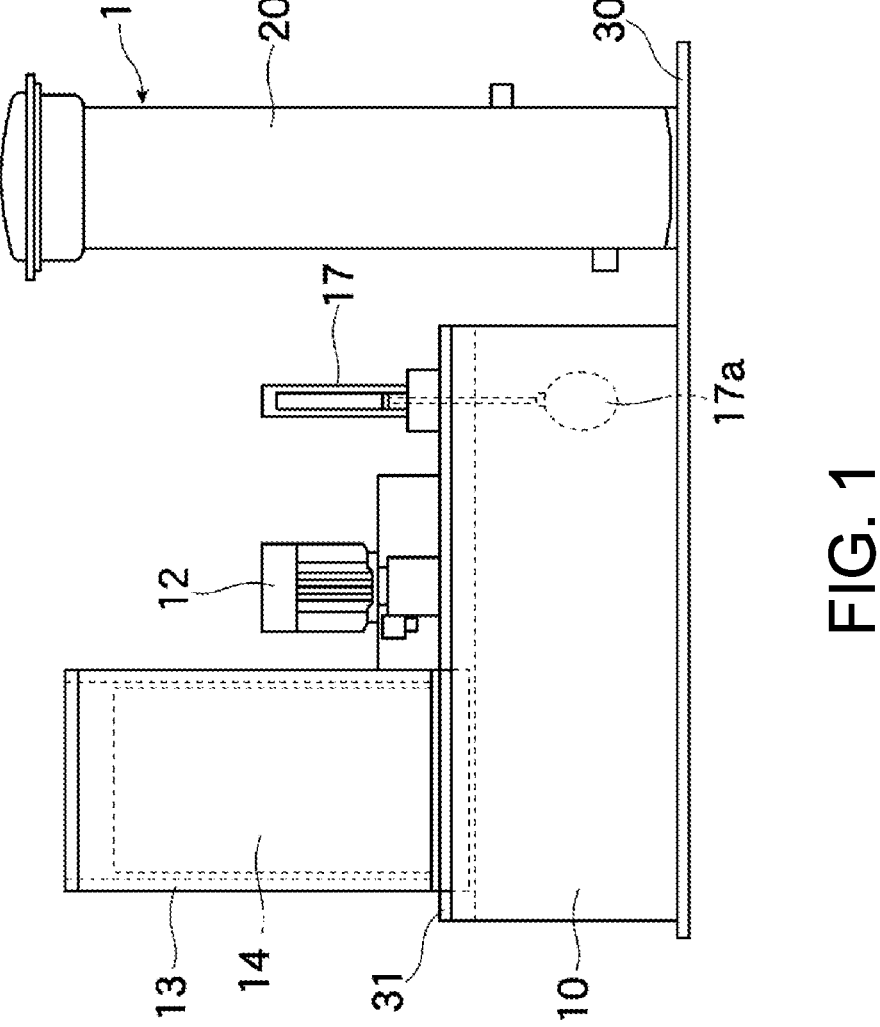
FIG. 1 is a front view showing a cleaning liquid reservoir apparatus used for implementing a method for removing oil in cleaning liquid according to a first embodiment of the present disclosure.
Figure 2:
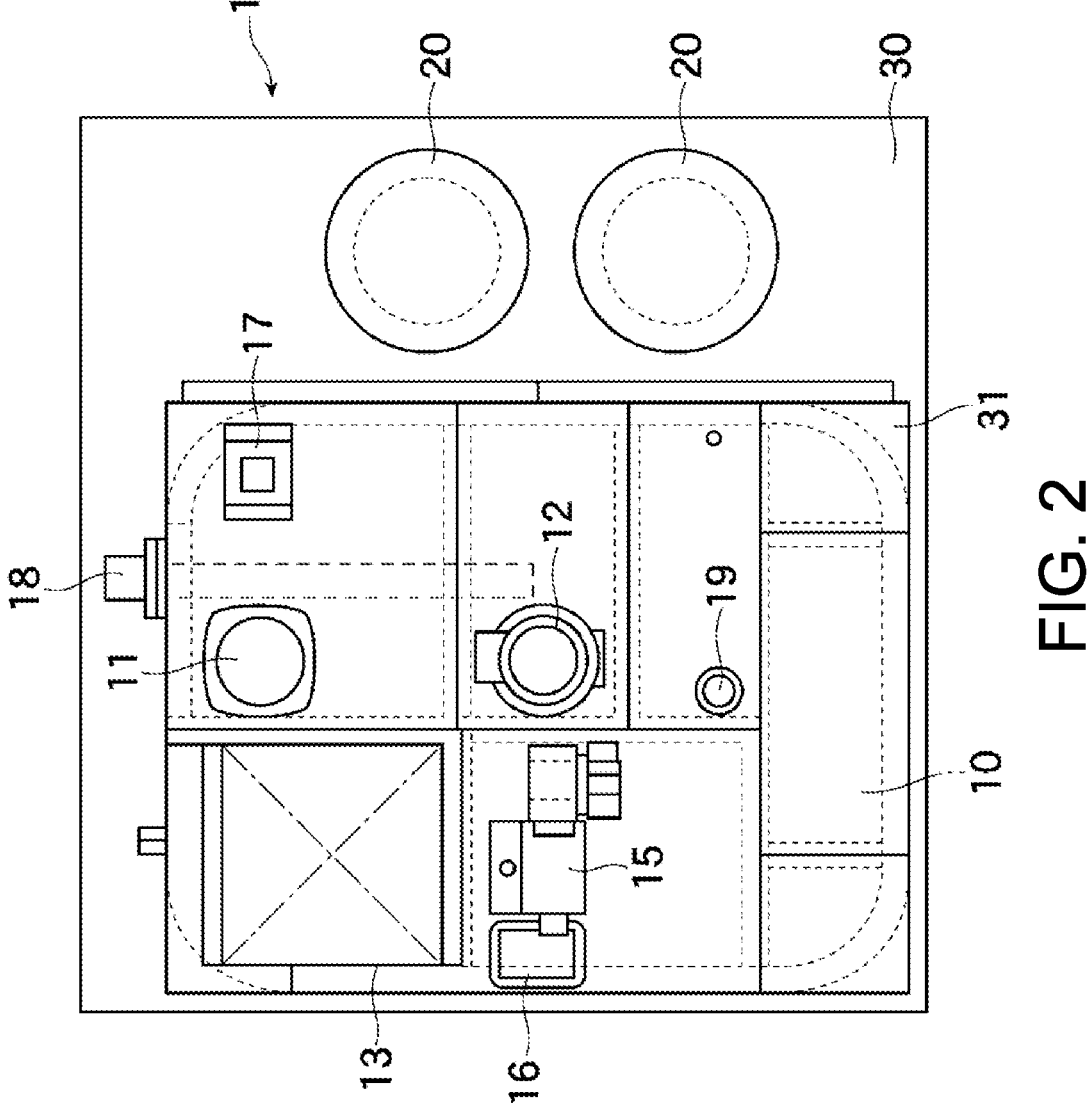
FIG. 2 is a plan view showing the cleaning liquid reservoir apparatus shown in FIG. 1.
Figure 3:
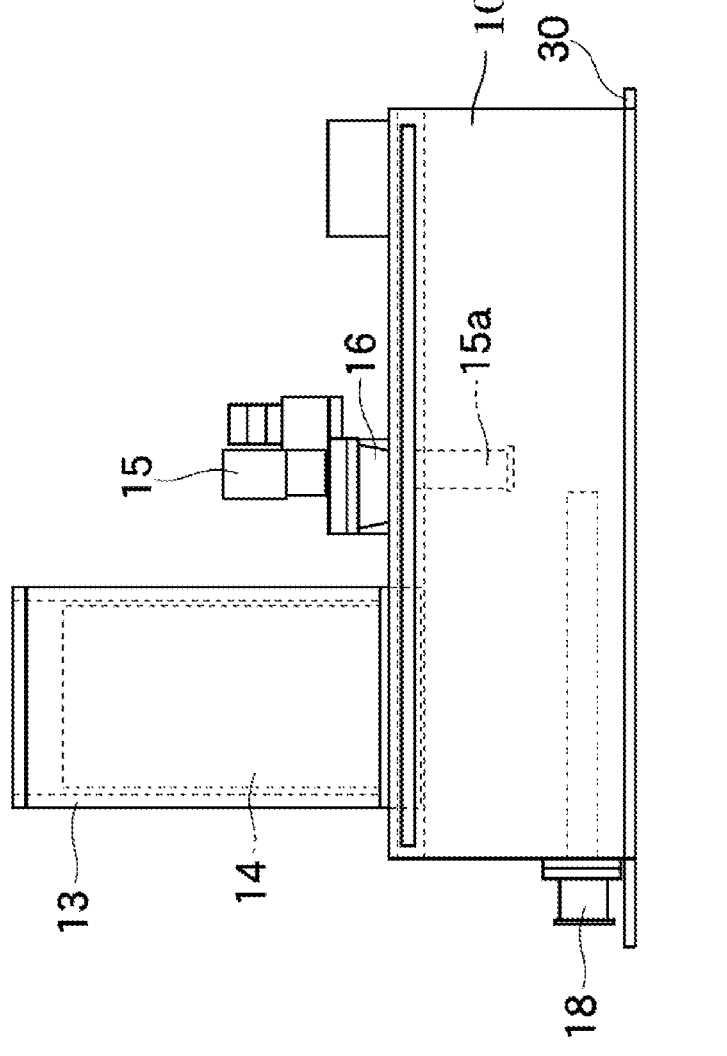
FIG. 3 is a left side view showing the cleaning liquid reservoir apparatus shown in FIG. 1.
Figure 4:
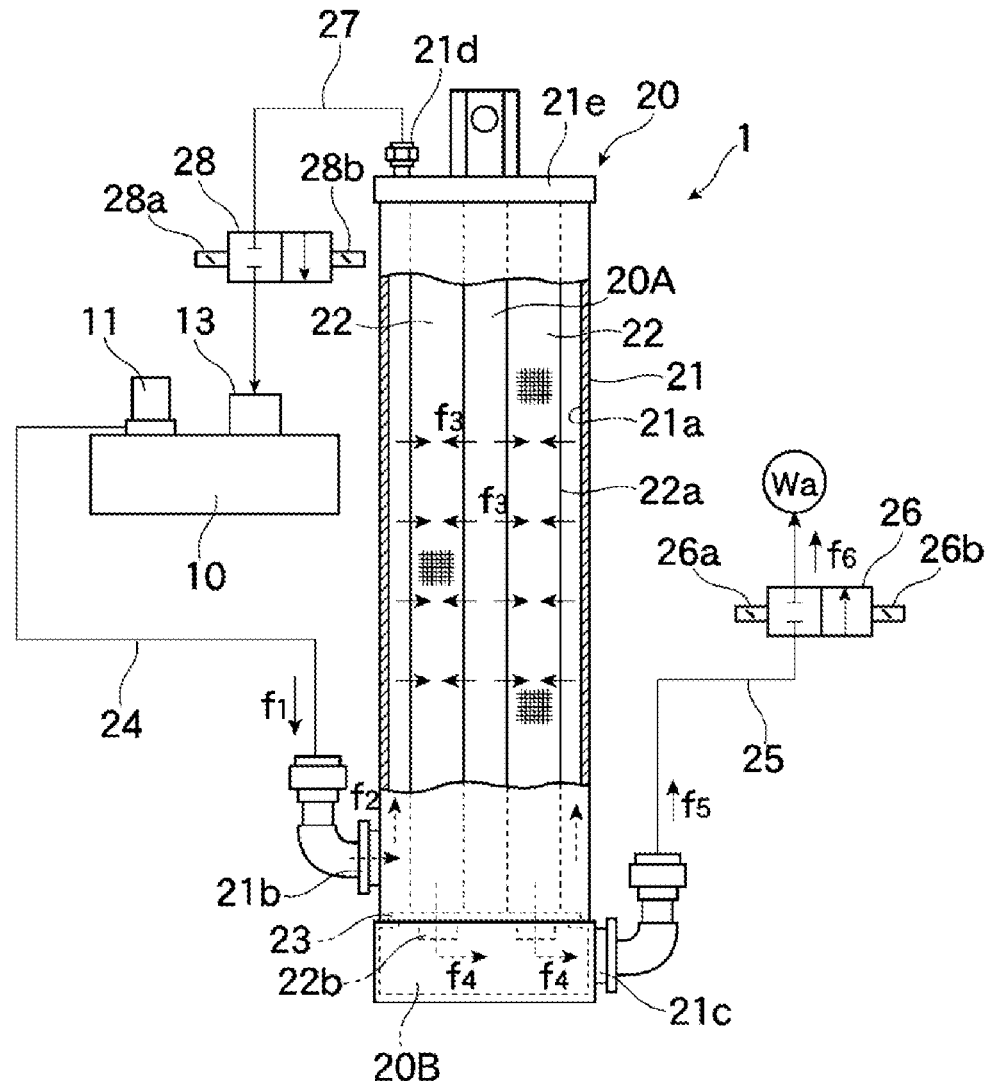
FIG. 4 is a view for explaining operation of the cleaning liquid reservoir apparatus shown in FIG. 1, being an explanatory view showing schematically a situation where cleaning liquid is injected on a site of cleaning.
Figure 5:
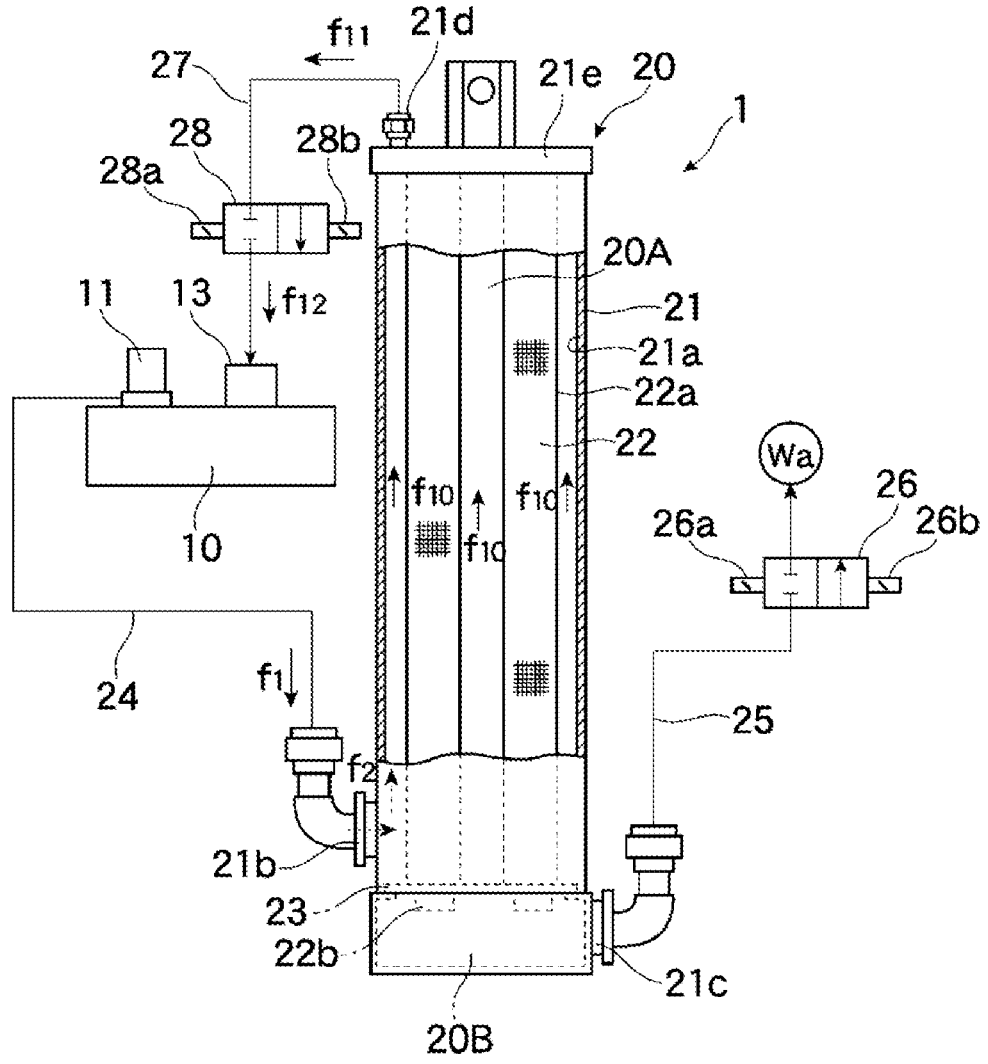
FIG. 5 is a view for explaining operation of the cleaning liquid reservoir apparatus shown in FIG. 1, being an explanatory view showing schematically a situation of causing a filter element to capture oil in cleaning liquid.
Figure 6:
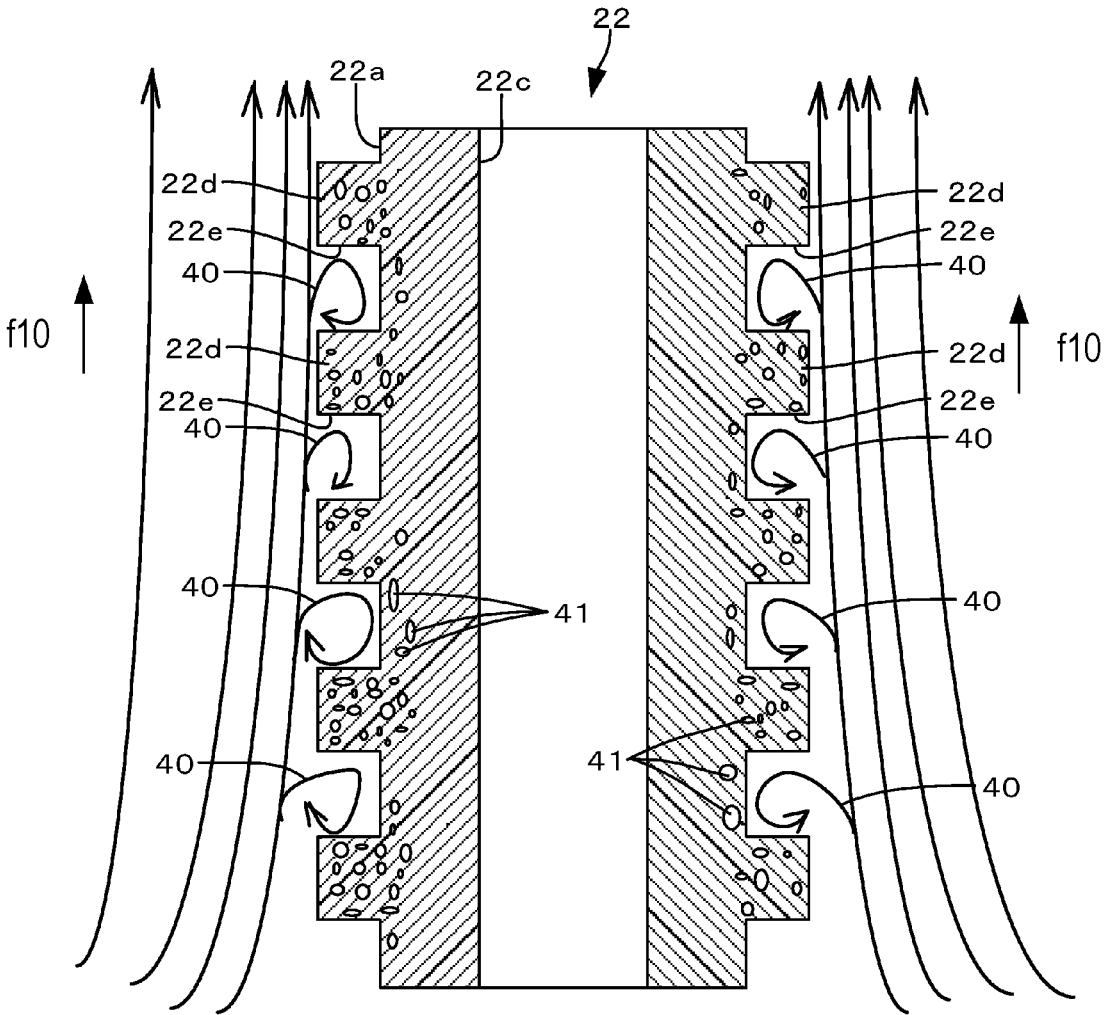
FIG. 6 is an enlarged sectional view showing schematically a situation of a filter element shown in FIG. 5 capturing oil in cleaning liquid.

A cleaning liquid reservoir apparatus used for implementing a method for removing oil in cleaning liquid according to a first embodiment of the present disclosure will be explained referring drawings below. FIG. 1 is a front view showing a cleaning liquid reservoir apparatus used for implementing a method for removing oil in cleaning liquid according to a first embodiment of the present disclosure. FIG. 2 is a plan view showing the cleaning liquid reservoir apparatus shown in FIG. 1. FIG. 3 is a left side view of FIG. 1 and FIG. 4 is a view for explaining operation of the cleaning liquid reservoir apparatus shown in FIG. 1, being explanatory views showing schematically a situation where cleaning liquid is injected on a site of cleaning. FIG. 5 is a view for explaining operation of the cleaning liquid reservoir apparatus shown in FIG. 1, being an explanatory view showing schematically a situation of causing a filter element to capture oil in cleaning liquid. FIG. 6 is an enlarged sectional view showing schematically a situation of a filter element shown in FIG. 5 capturing oil in cleaning liquid. Here, cleaning liquid in the embodiments of the present disclosure is one for cleaning a material to be cleaned by injecting cleaning liquid through a nozzle, etc., onto the material to be cleaned with a cleaning apparatus or by immersing the material to be cleaned in the cleaning liquid.

As shown in FIGS. 1 to 5, the cleaning liquid reservoir apparatus 1 of the first embodiment of the present disclosure is composed of a basket-shaped filter element 14, a filter equipment 20, a filter element 22 contained in the filter equipment 20, a first open/close valve 26, a second open/close valve 28, etc. A cleaning liquid reservoir tank 10 is provided on an oil pan 30 disposed on a floor. The oil pan 30 is disposed for preventing cleaning liquid from spilling onto the floor to stain surface thereof at a time of exchanging to new cleaning liquid, etc. The cleaning liquid reservoir tank 10 is a container having inner corner portions of r-shape in planner view in which cleaning liquid is stored. A lid 31 is provided on the upper side of the cleaning liquid reservoir tank 10. This lid 31 is provided for cover an opening on the upper side of the cleaning liquid reservoir tank 10, being divided into ones of predetermined size, and prevents foreign substance such as dust from entering into the cleaning liquid reservoir tank 10.

A filter bucket 13 is disposed on the upper side of the cleaning liquid reservoir tank 10. The basket-shaped filter element 14 is disposed within the filter bucket 13. This basket-shaped filter element 14 consists of a mesh basket made of nylon, etc., a basket made of paper filter or the like. This basket-shaped filter element 14 is one for receiving dirty cleaning liquid and primarily filtrating it removing dust, etc., when the dirty cleaning liquid has returned to the cleaning liquid reservoir tank 10 after cleaning operation of mechanical parts, etc., in a cleaning apparatus. It is also one for receiving dirty cleaning liquid and primarily filtrating it after cleaning operation of the filter element 22 in the filter equipment 20 as explained later. This primary filtration allows cleaning liquid to be filtrated to a level enabling it to be sucked with a feeding pump 11. Further, foreign substance collected in the basket-shaped filter element 14 is taken out when it is found that foreign substance has been accumulated over a decided amount or for each time that a decided period has lapsed, and an operator conducts operation of disposal.

The feeding pump 11 is provided on the lid 31. The feeding pump 11 sucks cleaning liquid stored within the cleaning liquid reservoir tank 10 through a sucking port and discharges cleaning liquid through a discharge port. The filter equipment 20 is provided at a position neighboring to the cleaning liquid reservoir tank 10 on the upper side of the oil pan 30. Further, a stirring pump 12 for stirring cleaning liquid within the cleaning liquid reservoir tank 10 is provided on the lid 31. By stirring cleaning liquid with this stirring pump 12, temperature of cleaning liquid becomes uniform as well as foreign substance mixed in cleaning liquid within the cleaning liquid reservoir tank 10 becomes not easily depositing, so that it becomes easy to collect foreign substance with the basket-shaped filter element 14 when the filter element 22 is cleaned.

The filter equipment 20 shown in FIGS. 4, 5, etc., is one for conducting secondary filtration of cleaning liquid removing foreign substance in the cleaning liquid (thorough filtration) and removal of a tiny amount of oil in the cleaning liquid, thus providing two functions. The filter equipment 20 is composed of a filter equipment body 21 forming a casing of the filter equipment 20, a filter element 22 contained within the filter equipment body 21, a partition 23 for separating the filter equipment 20 into a first room 20A and a second room 20B, an upper lid 21e covering an opening on the upper side of the filter equipment body 21, etc. An inlet port 21b disposed on the lower side for causing cleaning liquid after a primary filtration to flow into the first room 20A containing the filter element 22 and an outlet port 21c disposed on the upper side for causing cleaning liquid cleaned through a secondary filtration (thorough filtration) to flow out of the second room 20B are provided in the filter equipment body 21. A drain port 21d for causing dirty cleaning liquid having conducted cleaning of the filter element 22 and removal of tiny amount of oil to flow out of the filter equipment 20 is provided in the upper lid 21e of the filter equipment body 21. Here, while the filter equipment 20 is explained as having a composition in which the second room 20B is provided on the lower side of the first room 20A in this embodiment, the filter equipment may be composed such that the second room 20B is provided on the upper side of the first room 20A.

A first communicating flow path 24 for communicating of cleaning liquid is provided between the feeding pump 11 and the filter equipment 20 for causing the outlet port of the feeding pump 11 to communicate with the inlet port 21b of the filter equipment 20 and causing cleaning liquid discharged from the feeding pump 11 to flow into the filter equipment 20 (see FIGS. 4 to 5). Cleaning liquid discharged from the feeding pump 11 flows through the first communicating flow path 24 into the filter equipment 20. For removing fine oil, the filter element 22 serves as one that causes cleaning liquid flowing in through the inlet port 21b to flow in a direction parallel to the axis line of the filter element 22 and along the cylindrical outer circumferential surface thereof, thus causing the filter element 22 to capture fine oil in the cleaning liquid and causing the cleaning liquid to flow through the drain port 21d. Further, during cleaning of mechanical parts, etc., the filter element 22 serves as one that causes cleaning liquid having been subjected to a primary filtration and flowing in the inlet port 21b to flow in a radial direction of the filter element 22 conducting a secondary filtration (thorough filtration) for removing foreign substance in the cleaning liquid, thus causing cleaned cleaning liquid to flow out through the outlet port 21c to be cleaned cleaning liquid. A plurality of filter equipment 20 (for example, seven filter equipment) are provided.

As shown in FIG. 6, the filter element 22, being formed of lipophilic non-woven fabric of polypropylene, etc., has an inclination of fiber density in which percentage voids becomes lower from an outer circumferential surface 22a towards an inner circumferential surface 22c (in a radial direction) and has a definite filtration precision (a value of diameter of a particle to be captured with a filter defined in micron). Further, a plurality of annular protrusions 22d are provided on the outer circumferential surface 22a of the filter element 22 along substantially whole length of the filter element 22 in an axial direction thereof (see FIG. 6). Here, as various methods for producing the filter element 22 formed of non-woven fabric are known and such methods do not compose a gist of the present disclosure, it will not be explained in detail here.

With the filter element 22, cleaning liquid is filtrated usually (during cleaning) by allowing only clean liquid constituent to pass through the filter element 22 and inhibiting foreign substance contained in the cleaning liquid from passing through it when cleaning liquid having been subjected to a primary filtration passes from the side of the outer circumferential surface 22a of the filter element 22 to the side of the inner circumferential surface 22c (in a radial direction). Cleaning liquid having been subjected to a secondary filtration (through filtration) with the filter element 22 flows into the second room 20B through an end 22b of the filter element 22 provided so as to protrude to the side of the second room 20B (see FIG. 4). The filter element 22 in this embodiment provides a filtration precision of 10 microns, for example. Further, it may be such as to provide a filtration precision of 5 microns, 3 microns, etc., if desired to raise it.

A second communicating flow path 25 is provided between the outlet port 21c of the filter equipment body 21 and the cleaning portion Wa of a cleaning apparatus (not shown). A first open/close valve 26 is provided in a midway of the second communicating flow path 25. The first open/close valve 26 in this embodiment is an electromagnetic valve and the second communicating flow path 25 becomes closed state by exciting one solenoid 26a and degaussing the other solenoid 26b. In other words, the second communicating flow path 25 becomes closed state at the position of the first open/close valve 26 so that cleaning liquid does not flow out to the side of the cleaning apparatus. Further, the second communicating flow path 25 becomes open state by exciting the other solenoid 26b and degaussing the one solenoid 26a. In other words, the first open/close valve in the midway of the second communicating flow path 25 becomes communicating state so that cleaned cleaning liquid flows out to the side of the cleaning apparatus and injected through a cleaning nozzle (not shown).

With the filter equipment 20, while foreign substance in the cleaning liquid can be removed when cleaning liquid is caused to pass through the filter element 22 from the side of the outer circumferential surface 22*a* to the side of the inner circumferential surface 22*c*, fine oil contained in the cleaning liquid cannot be fully removed. When fine oil contained in the cleaning liquid increases and attaches to lipophilic material to be cleaned and fine foreign substance is contained in the oil, cleaning efficiency is lowered. Due to this, this cleaning liquid reservoir apparatus is provided with function of cleaning the filter element 22 and removing fine oil. That is, when the filter equipment 20 performs a secondary filtration (thorough filtration) for a definite time, foreign substance attaches to the outer circumferential surface 22*a* of the filter element 22 so that clogging is created in the filter element 22. Clogging in the filter element 22 inhibits passing or flowing of the cleaning liquid from the side of outer circumferential surface 22*a* to the side of the inner circumferential surface 22*c*, so that cleaning liquid is not supplied to the cleaning apparatus by a sufficient amount, thus resulting in lowering cleaning performance. For avoiding this, a drain flow path 27 is provided between the drain port 21*d* a in the upper lid 21*e* in the filter equipment 20 and the cleaning liquid reservoir tank 10. A second open/close valve 28 is provided in the midway of the drain flow path 27.

The second open/close valve 28 in this embodiment is an electromagnetic valve, and the drain flow path 27 becomes closed state by exciting one solenoid 28*a* and degaussing the other solenoid 28*b*. In other words, the drain flow path 27 becomes blocked state so that cleaning liquid within the filter equipment body 21 does not flow back through the drain flow path 27 to the side of the cleaning liquid reservoir tank 10. Further, the drain flow path 27 becomes open state by exciting the other solenoid 28*b* and degaussing the one solenoid 28*a*. In other words, the drain flow path 27 becomes communicating state so that cleaning liquid within the filter equipment body 21 can flow back through the drain flow path 27 to the side of the cleaning liquid reservoir tank 10. Here, the first open/close valve 26 and the second open/close 28 are controlled by control equipment (not shown). For example, it may be such that a change-over switch for selecting "cleaning" and "removal of oil" is provided on an operation board (not shown) and the first open/close valve 26 and the second open/close valve 28 are controlled with the control equipment by selectively operating the change-over switch. Here, while it is explained as to this embodiment that the first open/close valve and the second open/close valve are electromagnetic valves, they may be manually operated valves.

A liquid level gauge 17 for indicating level of stored cleaning liquid is provided in the cleaning liquid reservoir tank 10 (see FIG. 1). The liquid level gauge 17 of this arrangement is a float-type liquid level gauge that indicates liquid level with up and down movement of a float 17*a* made of stainless floating on a surface of liquid. This liquid level gauge 17 is composed so as to issue a signal by detecting a liquid level having attained the upper or lower limit position. For example, the lower limit position is set to be at a position higher by a definite distance than an upper face position of a cleaning liquid heater 18.

Further, a thermometer 19 is provided for measuring temperature of cleaning liquid stored in the cleaning liquid reservoir tank 10. Also, the cleaning liquid heater (liquid heater) 18 for heating cleaning liquid to be at a decided temperature in the cleaning liquid reservoir 10. The cleaning liquid heater 18 in this embodiment is a stainless heater with a function preventing empty heating. That is, cleaning liquid within the cleaning liquid reservoir tank 10 is one held to be within a definite temperature range with the cleaning liquid heater 18 being controlled by a controller (not shown) based on temperature data measured with the thermometer 19.

Further, an oil skimmer 15 as a floating substance removing equipment for removing substance having light specific gravity such as floating substance, oil, etc., is provided in the cleaning liquid reservoir tank 10. With this oil skimmer 15, floating substance on cleaning liquid within the cleaning liquid reservoir tank 10 is caused to attach to a metal belt 15*a* to be taken out onto the upper side of the cleaning liquid reservoir tank 10 and the floating substance, etc., attaching thereto is scraped to be collected into a floating substance collecting container 16.

Operation of the cleaning liquid reservoir apparatus 1 will be explained. FIG. 4 is an explanatory view showing schematically a situation where cleaning liquid is injected on a cleaning portion, and FIG. 5 is an explanatory view showing schematically cleaning of a filter element and a situation of removal of fine oil. In a case of conducting cleaning operation with cleaned cleaning liquid having been subjected to a secondary filtration (thorough filtration) through the filter equipment 20 of the cleaning liquid reservoir apparatus 1, for example, a change-over switch on an operation board (not shown) is set to be "cleaning" and a switching push-button "start" is pushed. A controlling equipment (not shown) activates the feeding pump 11 with the first open/close valve 26 in an opened state and the second open/close valve 28 in a closed state.

During cleaning of mechanical parts, etc., as shown in FIG. 4, cleaning liquid having been subjected to a primary filtration fed to the first communicating flow path 24 flows within the first communicating flow path 24 in a direction of an arrow f1, within the filter equipment 20 in a direction of arrows of f2, f3 and f4 and within the second communicating flow path 25 in a direction of arrows f5 and f6 to be fed to the cleaning portion Wa (see FIG. 4). That is, a secondary filtration (thorough filtration) of cleaning liquid is performed when cleaning liquid having been subjected to a primary filtration flows to pass through the filter element 22 from the side of the outer circumferential surface 22*a* to the side of inner circumferential surface 22*c* thereof in a radial direction of an arrow f3. In a cleaning apparatus, cleaning liquid injected through a nozzle for cleaning, etc., performs cleaning operation of a material to be cleaned (not shown) on its cleaning portion Wa. Cleaning liquid having gotten dirty flows through a flow path for flowing back (not shown) and is subjected to a primary filtration through a filter bucket 13 and a basket-shaped filter element 14 within the filter bucket 13, and returns to the cleaning liquid reservoir tank 10. In such a manner, cleaned cleaning liquid having been subjected to a secondary filtration (thorough filtration) with the filter equipment 20 is injected through a nozzle for cleaning onto a cleaning portion Wa without being exposed to external atmosphere, thus performing cleaning operation. In a case of stopping cleaning operation, a switching push-button "stop" on an operation board is pushed.

In a case of performing cleaning the filter element 22 and removing fine oil (oil droplets), for example, the change-over switch on an operation board (not shown) is set to be "remove oil" and the switching push-button "start" is pushed. A controlling equipment (not shown) activates the feeding pump 11 with the first open/close valve 26 in a closed state and the second open/close valve 28 in an opened state. As shown in FIG. 5, cleaning liquid fed with action of the feeding pump 11 flows within the first communicating flow path 24 in a direction of an arrow f1, within the filter equipment 20 in a direction of arrows of f2 and f10 and within the drain flow path 27 in a direction of arrows f11 and f12, thus performing cleaning of the filter element 22 and removing fine oil. That is, cleaning liquid flows in a space between an inner circumferential portion 21*a* of the filter equipment body 21 and the outer circumferential surface 22*a* of the filter element 22 in a direction of the arrow f10 so that cleaning of the filter element 22 and removal of fine oil are performed with this flow of cleaning liquid. In a case of stopping operation of cleaning the filter element and removing oil, a switching push-button "stop" on an operation board is pushed.

That is, as shown in FIG. 6, cleaning liquid fed from the feeding pump 11 flows only in a direction parallel to axis line of the cylindrical filter element 22 along the cylindrical outer circumferential surface 22*a*. In this, a plurality of annular protrusions each having a rectangular cross section protruding along substantially whole length of the filter element 22 in axis line direction thereof are formed on the outer circumferential surface 22*a* of the filter element 22. Due to this, innumerable small eddies 40 are created in annular grooves 22*e* between the neighboring annular protrusions 22*d*. Such eddies 40 are created by Coanda effect in a situation where cleaning liquid having viscosity flows along the annular grooves 22*e*. As such eddies 40 are of a negative pressure, fine oil 41 lighter than water is separated from water and captured by filament of the filter element 22. Coanda effect is known as a character of fluid by which jet of fluid having viscosity is pulled towards a neighboring wall surface or maintains contact with a wall surface having a protruding shape thereon, and creation of the effect is not related essentially to dimensions of the wall or protruding shape (see U.S. Pat. No. 2,052,869). Here, while the annular protrusions 22*d* in this embodiment have a rectangular sectional shape, they may be one having annular protrusions with a triangular, circular, etc., sectional shape if they provide turbulent flow in cleaning liquid. Further, such annular protrusions may be formed on the outer circumferential surface of the filter element 22 so as to have a spiral form.

Further, separation of foreign substance attaching to the outer circumferential occurs simultaneously and, while separated comparatively large foreign substance flows away along with flowing cleaning liquid, small foreign substance and tiny oil (oil droplets) are captured by fiber. Dirty cleaning liquid having gotten dirty that has performed cleaning of the filter element 22 flows through the drain flow path 27 shown in FIG. 5, is subjected to a primary filtration through the filter bucket 13 and the basket-shaped filter element 14 within the filter bucket 13, and returns to the cleaning liquid reservoir tank 10. When cleaning operation is not conducted, cleaning of the filter element 22 and removal of fine oil (droplets) can be performed by operation of change-over of the first open/close valve 26 and the second open/close valve 28, so that operating ratio of the cleaning apparatus can be improved. The filter element 22 in the first embodiment of the present disclosure is made of non-woven fabric of polypropylene, etc., of low expense and fine oil in cleaning liquid can be removed efficiently without using a filtering apparatus dedicated to oil-water separation with a special composition, so that expense for production and expense for operation can be decreased and disposal of filter elements thereof can be conducted in a safe manner without applying load on circumstances.

(Cleaning Liquid Reservoir Apparatus Used in a Second Embodiment)

Figure 7:
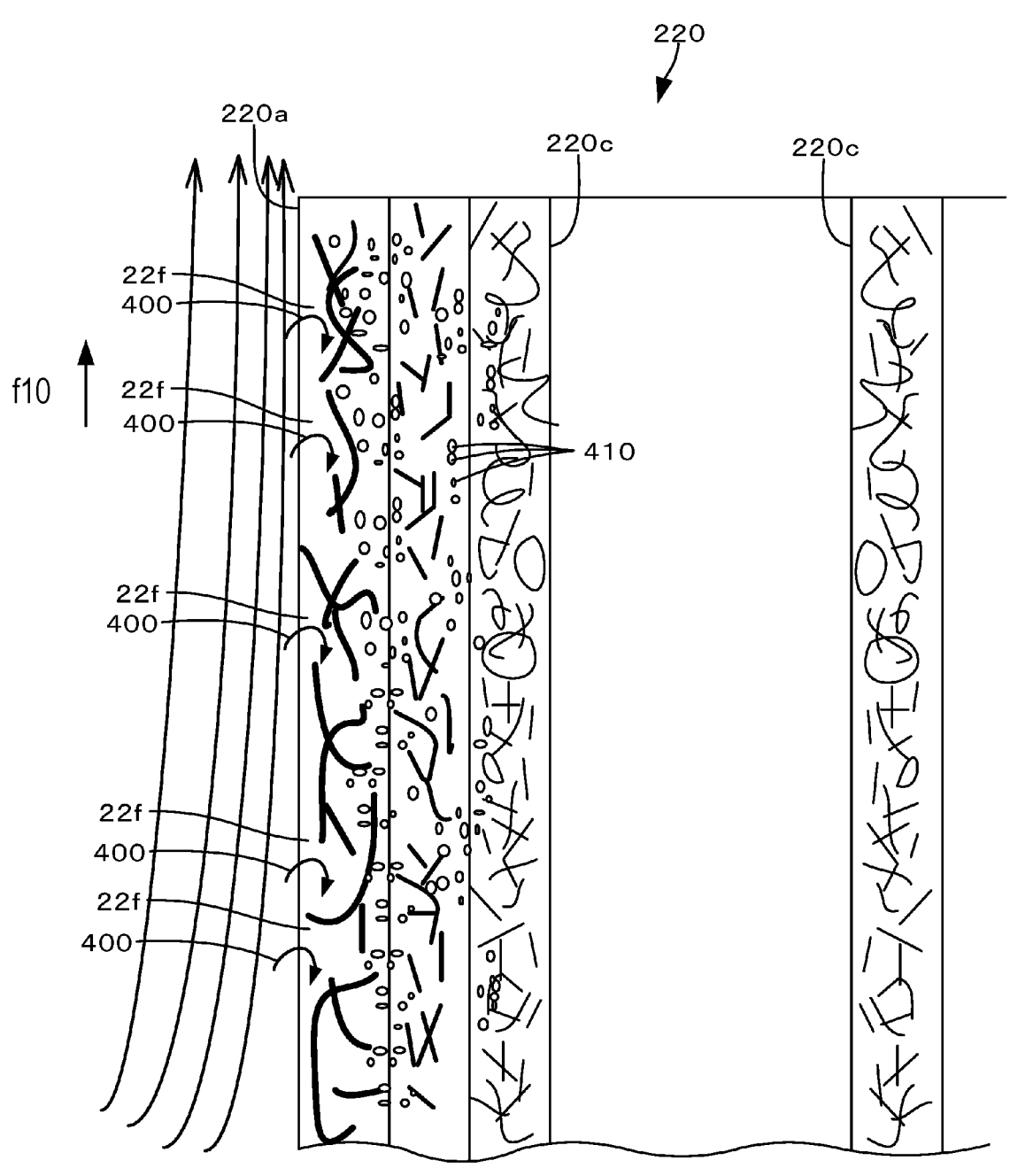
FIG. 7 is an enlarged lateral sectional view showing schematically a situation of catching oil in cleaning liquid by a filter element of a second embodiment of the present disclosure.

FIG. 7 is an enlarged lateral sectional view showing schematically a situation of removing oil in cleaning liquid by a filter element 220 used in a second embodiment of the present disclosure. As shown in FIG. 7, the annular protrusions 22*d* in the first embodiment are not formed on an outer circumferential surface 220*a* of a filter element 220 used in a second embodiment of the present disclosure. However, the filter element 220 is formed of non-woven fabric of lipophilic polypropylene, etc., and has an inclination of fiber density in which percentage voids becomes lower from an outer circumferential surface 220*a* towards an inner circumferential surface 220*c*. Three layers of filter having density and thickness different each other are laminated in this embodiment. Consequently, when cleaning liquid fed from a feeding pump 11 flows in a direction parallel to the axis line of the filter element 220 along the outer circumferential surface 220*a* thereof, innumerable small eddies 400 are created in voids 22*f* on the outer circumferential surface 220*a* having a thick fiber diameter and high percent voids. Such eddies 400 are created by Coanda effect in a situation where cleaning liquid having viscosity flows along the voids 22*f*. As such eddies 400 are of a negative pressure, fine oil 410 lighter than water is separated from water and captured by filament of the lipophilic filter element 220. Here, as one in which multiple layers of non-woven fabric having percentage voids different each other are laminated is a known technique (for example, JP, Published Patent Application 2013-236985), a method for production thereof is not explained in detail.

OTHER EMBODIMENTS

While embodiments of the present disclosure have been explained above, the present disclosure is not limited to these. For example, while the filter element was utilized in both ways of filtration of cleaning liquid in which cleaning liquid is caused to flow from the side of the outer circumferential surface 22*a* to the side of the inner circumferential surface 22*c* and removal of fine oil in which cleaning liquid is caused to flow only in a direction parallel to the axis line of the filter element along the cylindrical outer circumferential surface thereof, it may be utilized only for removing tiny oil. Further, the filter element as shown in FIG. 7 utilizes one consisting of three layers having thickness of fiber different each other so as to reduce percentage voids from the outer circumferential surface towards the inner circumferential surface. However, for the purpose of removing fine oil in cleaning liquid as an object of the present disclosure, filament forming the filter filament needs not necessarily be layered one, but may be non-woven or woven fabric having continuously changing density as long as it creates eddies efficiently. Further, fiber having uniform density or same thickness may be utilized as long as it creates eddies efficiently.

What is claimed is:

1. A cleaning liquid reservoir apparatus equipped with:
   a cleaning liquid reservoir tank as a container for storing cleaning liquid to be fed to an object to be cleaned for performing a cleaning operation,
   a filter equipment provided neighboring to the cleaning liquid reservoir tank, a filter element contained in the filter equipment for filtrating cleaning liquid, said filter element being in a cylindrical shape and having an inner cavity within the same, and a feeding pump provided in the cleaning liquid reservoir tank for pumping up a cleaning liquid stored in the cleaning liquid reservoir tank, discharging the cleaning liquid through a discharge port of the feeding pump to feed the cleaning liquid to the filter equipment;

wherein a plurality of annular protrusions are formed on a cylindrical outer circumferential surface of the filter element, and the cleaning liquid fed with the feeding pump is caused to flow in a direction parallel to an axis line of the filter element and along the cylindrical outer circumferential surface of the filter element, thus causing the filter element to capture oil in the cleaning liquid.

2. The cleaning liquid reservoir apparatus according to claim 1, wherein the filter element is made of non-woven fabric having an inclination of fiber density in which percentage voids becomes lower from the cylindrical outer circumferential surface of the filter element towards an inner circumferential surface of the filter element.

3. The cleaning liquid reservoir apparatus according to claim 1, further comprising:

a first communicating flow path (24) for causing the discharge port of the feeding pump to communicate with an inlet port of the filter equipment (20), a second communicating flow path (25) for feeding the cleaning liquid having been subjected to a secondary filtration from an outlet port of the filter equipment (20) to the object to be cleaned, a first open/close valve (26) provided in the second communicating flow path (25) for opening-closing of the second communicating flow path (25), a drain port (21d) provided in the filter equipment (20) for discharging the cleaning liquid within the filter equipment (20) out of the filter equipment (20), a drain flow path (27) for causing the cleaning liquid to flow back from the drain port (21d) of the filter equipment (20) to the cleaning liquid reservoir tank, and a second open/close valve (28) provided in the drain flow path (27) for opening-closing of the drain flow path (27); and wherein the capturing of the oil with the filter element is performed with lipophilic fiber of the filter element in such a manner that, with the first open/close valve (26) being in a closed state and the second open/close valve in an open state, the cleaning liquid is caused to flow through a space between an inner circumferential portion of the filter equipment (20) and the cylindrical outer circumferential surface of the filter element.

* * * * *